(12) United States Patent
Ishikawa et al.

(10) Patent No.: US 6,243,519 B1
(45) Date of Patent: Jun. 5, 2001

(54) OPTICAL FIBER CABLE AND METHOD OF MAKING THE SAME

(75) Inventors: Hiroki Ishikawa; Yoshiyuki Suetsugu; Teruo Araki; Tadaaki Haruki, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/401,189

(22) Filed: Sep. 23, 1999

(30) Foreign Application Priority Data

Sep. 25, 1998 (JP) .................................................. 10-271543
Sep. 25, 1998 (JP) .................................................. 10-271550

(51) Int. Cl.$^7$ .................................................. G02B 6/44
(52) U.S. Cl. ..................... 385/111; 385/101; 385/104; 385/105; 385/103; 385/110; 174/112
(58) Field of Search .................................... 385/111, 104, 385/101, 110, 105, 103; 174/112

(56) References Cited

U.S. PATENT DOCUMENTS

| | | | | |
|---|---|---|---|---|
| 4,543,448 | * | 9/1985 | Deurloo | 174/112 |
| 4,828,352 | | 5/1989 | Kraft . | |
| 4,880,484 | * | 11/1989 | Obermeier | 156/51 |
| 5,142,105 | * | 8/1992 | Kihlken | 174/112 |
| 5,729,966 | | 3/1998 | Grulick . | |
| 5,745,628 | * | 4/1998 | Benzel | 385/104 |
| 5,809,194 | * | 9/1998 | Lovie | 385/104 |

* cited by examiner

Primary Examiner—Cassandra Spyrou
Assistant Examiner—Leo Boutsikaris
(74) Attorney, Agent, or Firm—McDermott, Will & Emery

(57) ABSTRACT

In an optical fiber cable with a jacket in which a plurality of optical fibers are assembled as being S-Z stranded about a central member, a ferromagnetic member is disposed near an inner peripheral surface of the jacket along an S-Z stranded line formed by one of the optical fibers.

17 Claims, 14 Drawing Sheets

OPTICAL FIBER CABLE AND METHOD OF MAKING THE SAME

BACKGROUND OF THE INVENTION

1. Field of the Invention

The present invention relates to an optical fiber cable laid underground, on the ground, overhead, or undersea and a method of making the same; and, in particular, to an optical fiber cable with jacket in which a plurality of optical fibers are assembled as being S-Z stranded, and a method of making the same.

2, Related Background Art

There has conventionally been known an optical fiber cable with a jacket in which a plurality of optical fibers are assembled as being S-Z stranded about a central member embedding therein a tension member. Such an optical fiber cable is laid underground, on the ground, overhead, or undersea. There are cases where, even after the optical fiber cable is once laid, it is necessary to take out and branch a part of the optical fibers included in the optical fiber cable by removing or ripping a part of the jacket in an intermediate portion of the optical fiber cable (so-called late intermediate branching).

Here, in an optical fiber cable containing therein a plurality of optical fibers extending in their S-Z state, the length of each contained optical fiber would be longer than the length of the optical fiber cable itself (which is identical to the length of-the central member). Therefore, if the jacket is removed from near a reverse portion of the S-Z stranded line formed by an optical fiber (referring to the portion in which the optical fiber reverses from S-strand to Z-strand or vice versa), the optical fiber can smoothly be taken out from the optical fiber cable without being pulled in excess. In view of this point, the workability at the time of branching after laying the cable will improve if the reverse portion of the S-Z stranded line formed by the optical fiber is discernible from the outside of the jacket of the optical fiber cable.

As techniques relating to the above-mentioned matter, those disclosed in U.S. Pat. Nos. 4,828,352 and 5,729,966 have been known. In the conventional optical fiber cables described in these publications, a plurality of optical fibers (optical fibers or optical fiber ribbons) are assembled as being S-Z stranded about a central member. Thus assembled optical fibers are surrounded with a jacket made of a synthetic resin or the like. The jacket is provided with a reverse-portion-indicating mark, such as a symbol, letter, or the like, at the position corresponding to a reverse portion of the S-Z stranded line formed by each optical fiber.

Such an optical fiber cable is made according to the following procedure. Namely, in the case where the steps of stranding optical fibers to forming the jacket are carried out by a single manufacture line, while a core marker apparatus is disposed downstream of a jacket-cooling water bath. Also, a signal indicative of the reversing direction of the lay plate located on the most downstream side among a plurality of lay plates used for stranding the optical fibers about the central member is taken out. When it is determined according to this signal, the feeding length of the central member, and a predetermined offset length that a reverse portion has reached the core marker apparatus, then a reverse-portion-indicating mark is formed on the jacket by the core marker apparatus.

In the case where the step of stranding the optical fibers and the step of forming the jacket are separated from each other, on the other hand, the position of the reverse portion is determined in the step of stranding the optical fibers according to a process similar to that in the above-mentioned case where the optical fiber cable is made by a single manufacture line, and then a color tape, metal tape, or the like indicative of the position of the reverse portion is attached onto a wrapping binder tape wound about the outer periphery of each optical fiber. In the step of forming the jacket, the color tape or the like attached on the wrapping binder tape is detected by a color sensor, metal sensor, or the like before extrusion-molding the jacket, and a reverse-portion-indicating mark is formed on the extrusion-molded jacket according to thus detected signal.

SUMMARY OF THE INVENTION

The optical fiber cable disclosed in the above-mentioned publications is made by attaching a reverse-portion-indicating mark onto an extrusion-molded jacket after detecting the position of a reverse portion according to a color tape or the like attached to a wrapping binder tape for indicating the position of the reverse portion or according to the operation of a lay plate and the like before disposing the jacket around optical fibers. In thus manufactured optical fiber cable, if the reverse-portion-indicating mark were not provided, it would substantially be impossible to find the position of the reverse portion inside the jacket from the outside of the jacket after the jacket is once formed. Also, when making the optical fiber cable, equipment for sticking the color tape or the like is necessary, thus increasing the cost needed for production facilities for the optical fiber cable, thereby raising the cost for making the optical fiber cable.

Further, the reverse-portion-indicating mark attached on the jacket for indicating the position of the reverse portion may disappear after the optical fiber cable is laid. In this case, it is also impossible to detect the position of the reverse portion from the outside of the jacket unless the jacket is removed completely and so forth. As a consequence, in the case where the reverse-portion-indicating mark on the jacket is peeled off, it becomes quite difficult to find the position of the reverse portion inside the jacket from the outside of the jacket, whereby the workability in the branching after laying the cable would deteriorate remarkably.

Therefore, it is an object of the present invention to provide an optical fiber cable in which a reverse portion is discernible from the outside of the jacket, from which optical fibers can be taken out favorably after the cable is laid, and which can be made easily at a low cost, and a method of making the same.

For solving the above-mentioned problems, the optical fiber cable in accordance with the present invention is an optical fiber cable with a jacket in which a plurality of optical fibers are assembled as being S-Z stranded about a central member, the optical fiber cable further comprising a ferromagnetic member disposed near an inner peripheral surface of the jacket along an S-Z stranded line formed by one of the optical fibers.

This optical fiber cable is made by the method of making an optical fiber cable in accordance with the present invention comprising the step of disposing a ferromagnetic member along an S-Z strand formed by one of optical fibers so as to position the ferromagnetic member near an inner peripheral surface of a jacket.

When a plurality of optical fibers are assembled as being S-Z stranded about a central member, the reverse portions of the S-Z stranded line formed by the optical fibers are positioned on the circumference of the same circle about the center axis of the optical fiber cable ("optical fiber" in this specification collectively referring to optical fibers, optical fiber ribbons, stacked optical fiber ribbons, tubes in which contained optical fibers, and the like). In view of this point, in the optical fiber cable and the method of making the same in accordance with the present invention, the ferromagnetic member is disposed along the S-Z stranded lines formed by one of optical fibers. Also, the ferromagnetic member is disposed near the inner peripheral surface of the jacket.

In thus manufactured optical fiber cable, the position of a reverse portion of each optical fiber can be found by detecting a reverse portion of the ferromagnetic member. Specifically, the reverse portion of the ferromagnetic member can be detected easily and reliably from the outside of the jacket by use of a metal sensor or the like. Namely, in accordance with the present invention, an optical fiber cable in which reverse portions of the S-Z stranded line formed by each optical fiber are discernible from the outside of the jacket can be made easily at a low cost.

In this case, an iron wire is preferably used as the ferromagnetic member. Namely, among ferromagnetic members, the iron wire is inexpensive and excellent in its handling characteristics. As a consequence, the optical fiber cable in accordance with the present invention can be made easily at a low cost thereby.

Preferably, a reverse portion of the S-Z stranded line formed by the ferromagnetic member is detected from outside the jacket, and a reverse-portion-indicating mark is marked at a position in the jacket corresponding to the reverse portion. As a consequence, it becomes possible to provide the jacket with the reverse-portion-indicating mark in the state accurately corresponding to the position of the reverse portion of the S-Z stranded line formed by the optical fiber. It is also possible to confirm whether the reverse-portion-indicating mark accurately corresponds to the position of the reverse portion of the optical fiber or not after the optical fiber cable is accomplished. Further, since it becomes unnecessary to effect marking for indicating the reverse portion of the optical fiber before disposing the jacket, marking materials (paints, various tapes, and the like) can be prevented from mingling with materials for the jacket at the time of disposing the jacket.

Preferably, for detecting a reverse portion of the ferromagnetic member in this case, a plurality of metal sensors each having a coil are used, and the reverse portion is detected according to the induced current generated in each coil. As a consequence, the reverse portion of the ferromagnetic member can be detected easily and reliably from outside the jacket.

For assembling optical fibers as being S-Z stranded about the central member and disposing the ferromagnetic member, the following method is preferably employed.

Namely, a multi-slotted chamber element having an outer periphery formed with a plurality of S-Z stranded grooves is used as the central member, and the ferromagnetic member is secured so as to be positioned between a pair of neighboring slots or within one of the slots.

Preferably, the method further comprises the step of using a plurality of optical fiber units each containing therein a predetermined number of optical fibers, and assembling the optical fiber units as being S-Z stranded about the central member. Preferably, the ferromagnetic member is supplied so as to extend along one of the optical fiber units when the optical fiber units are being assembled about the central member, or is secured to one of the optical fiber units beforehand.

Preferably, in this case, the optical fiber unit is formed by containing a predetermined number of optical fibers within a single-slotted chamber element or within a loose tube.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF ON OF THE DRAWINGS

DESCRIPTION OF THE PREFERRED EMBODIMENTS

Figure 1:
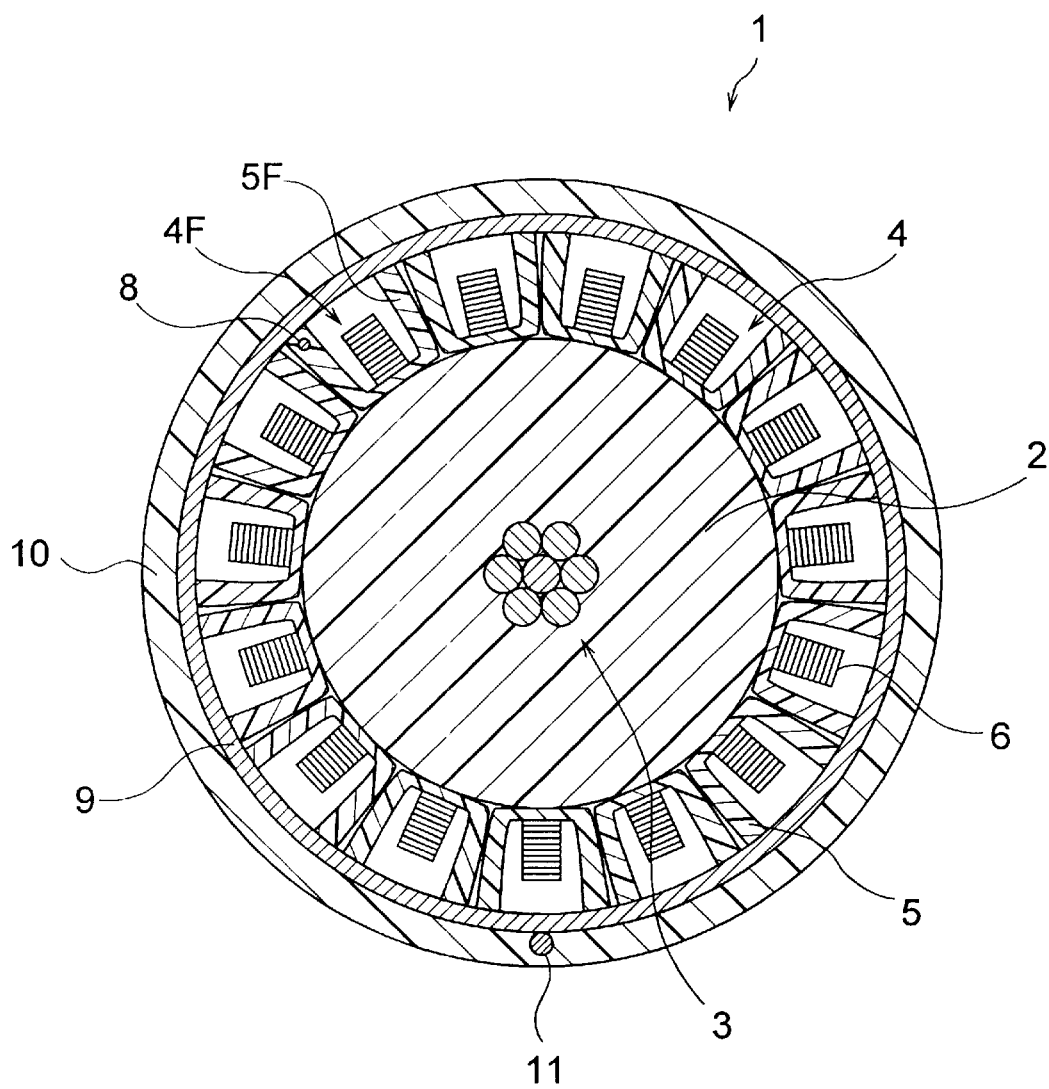
FIG. 1 is a sectional view showing a first embodiment of the optical fiber cable in accordance with the present invention.

In the following, preferred embodiments of the optical fiber cable and method of making the same in accordance with the present invention will be explained in detail with reference to the accompanying drawings. To facilitate the comprehension of the explanation, the same reference numerals denote the same parts, where possible, throughout the drawings, and a repeated explanation will be omitted.

First Embodiment

FIG. 1 is a sectional view showing a first embodiment of the optical fiber cable in accordance with the present invention. At the center of the optical fiber cable 1 shown in this drawing, there is an extra-long column 2 functioning as a central member. The column 2 is made of a synthetic resin such as LDPE resin or the like, and has an outside diameter of 25 mm. In the center of the column 2, a single strand of steel 3 is embedded. Seven steel wires each having a diameter of 2 mm are stranded so as to form the single strand of steel 3. On the outer periphery of the column 2, 15 optical fiber units 4 are each S-Z stranded (see FIG. 3). Each optical fiber unit 4 has an S-Z strand pitch (length which is twice the distance between neighboring reverse portions) of 900 mm, and an S-Z reversal angle $\phi$ of 275°.

Figure 2:
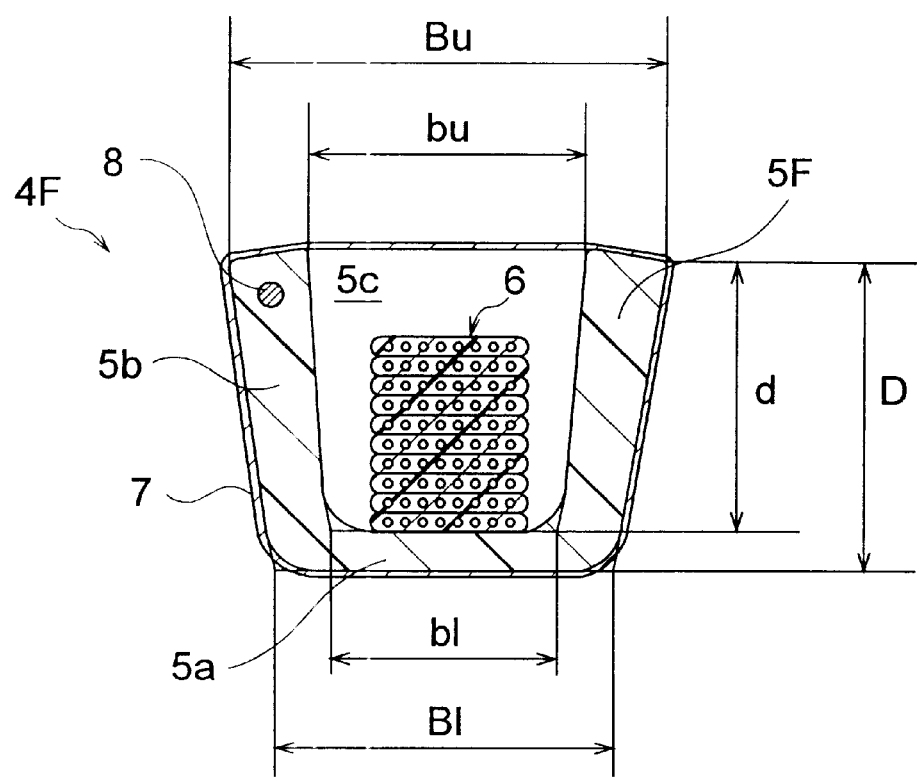
FIG. 2 is a sectional view showing an optical fiber unit contained in the optical fiber cable of FIG. 1.

Here, as shown in FIG. 1, one of 15 optical fiber units 4 (an optical fiber unit 4F) has a ferromagnetic member 8 secured therewithin. As shown in FIG. 2, a single-slotted chamber element 5F and a fiber stack 6 formed by stacking optical fiber ribbons are unitized so as to form the optical fiber unit 4F. The single-slotted chamber element 5F is produced as a single straight long member by extrusion-molding PBT resin or the like, and has substantially a U-shaped cross section. The bottom face 5a and a pair of side portions 5b of the chamber element 5F define one fiber container 5c which can contain various kinds of optical fibers such as optical fibers, optical fiber ribbons, and loose tubes containing optical fibers therein.

Also, the ferromagnetic member 8 is embedded in the upper end part of one of the pair of side portions 5b (on the left side in FIG. 2). In this optical fiber cable 1, a 0.4-mm iron wire (ferromagnetic wire material) is used as the ferromagnetic member 8. Among the ferromagnetic members, the iron wire is inexpensive and excellent in its handling characteristics. Therefore, the optical fiber cable in accordance with the present invention can be made easily at a low cost. As the ferromagnetic member 8, not only the iron wire, but also a nickel wire, a cobalt wire, and the like may be used. For embedding the chamber element 5F, it will be sufficient if the ferromagnetic member 8 is extrusion-molded together with molten PBT resin or the like. Dimensions of the chamber element 5 are such that Bu=6.0 mm, bu=4.0 mm, Bl=5.0 mm, bl=3.5 mm, D=5.0 mm, and d=4.5 mm.

The fiber stack 6 is constituted by stacked 10 layers of 8-core optical fiber ribbons. The fiber stack 6 is contained in the fiber container 5c of the chamber element 5F. Also, a wrapping binder tape 7 made of a nonwoven fabric or the like is wound about the chamber element 5F containing the fiber stack 6. As a consequence, the chamber element 5F and the fiber stack 6 are unitized.

In each of the optical fiber units 4 other than the optical fiber unit 4F, a chamber element 5 and a fiber stack 6 are unitized. The chamber element 5 is identical to the chamber element 5F except that the ferromagnetic member 8 is not embedded in its side portions 5b. As the individual optical fiber units 4 (including 4F) are S-Z stranded about the central member 2, the fiber stacks 6 as optical fibers are assembled as being S-Z stranded about the column 2.

As shown in FIG. 1, a wrapping binder tape 9 made of a nonwoven fabric or the like is tightly wound about the optical fiber units 4 that are S-Z stranded about the outer peripheral surface of the column 2. Further, a jacket 10, made of a low-density polyethylene, having an outside diameter of 41 mm is disposed around the wrapping binder tape 9. As a consequence, the inside of the optical fiber cable 1 is protected. Also, as shown in FIG. 1, one tear string 11 is contained in the jacket 10.

Figure 3:
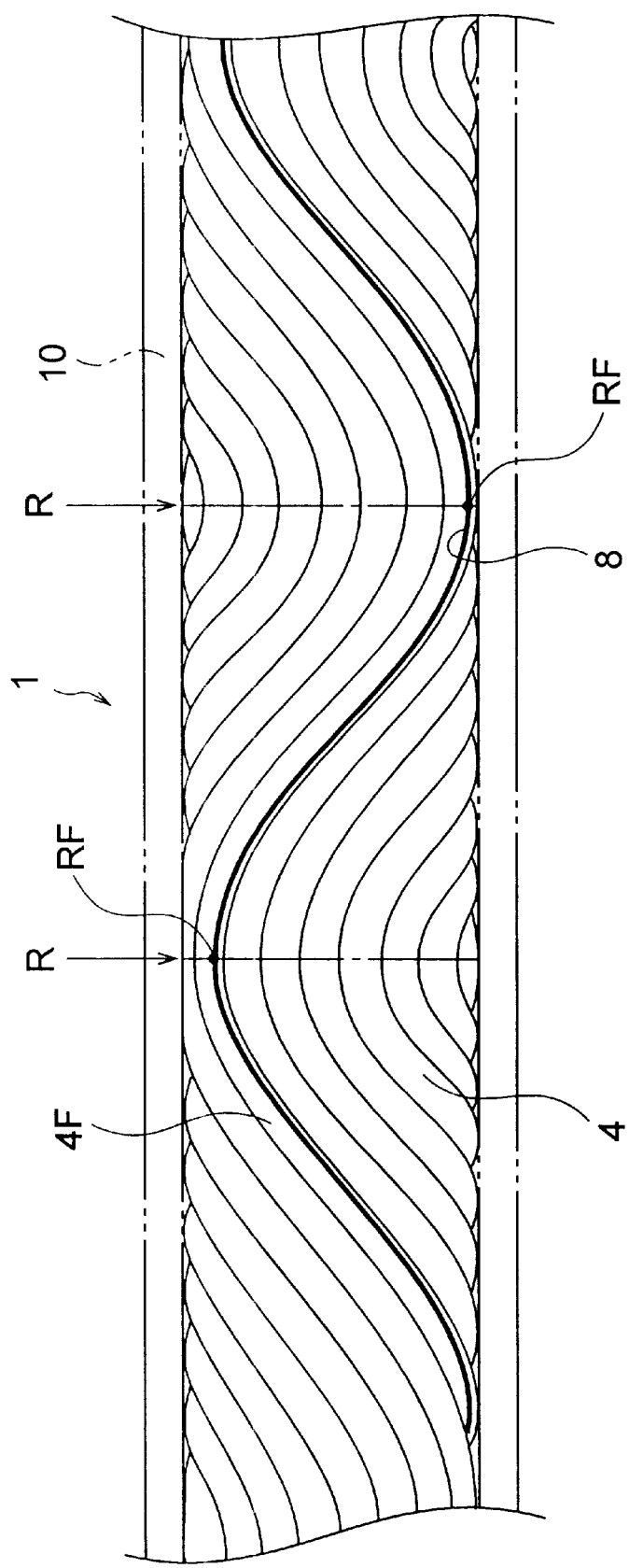
FIG. 3 is a plan view showing the inside of the jacket provided in the optical fiber cable of FIG. 1.

Within the jacket 10 of the optical fiber cable 1, as shown in FIG. 3, each of the optical fiber units 4, 4F containing the fiber stack 6 therein forms a stranded line extending in an S-Z form (hereinafter referred to as "S-Z stranded line"). This S-Z stranded line includes a portion at which the optical fiber unit 4, 4F reverses from S-strand to Z-strand or vice versa (hereinafter referred to as "reverse portion R"). As shown in FIG. 3, the reverse portions R of S-Z loci formed by the individual optical fiber units 4, 4F are located on the circumference of the same circle about the center axis of the optical fiber cable 1.

Since the ferromagnetic member 8 is contained in the optical fiber unit 4F, it similarly forms an S-Z stranded line within the jacket 10 of the optical fiber cable 1 as shown in FIG. 3. The S-Z stranded line formed by the ferromagnetic member 8 also includes a reverse portion RF, which is located on the circumference of the same circle as those of the reverse portions R of the individual optical fiber units 4, 4F. Also, since the ferromagnetic member 8 is embedded in the upper end part of one side portion 5b of the chamber element 5F contained in the optical fiber unit 4F, it would be located near the inner peripheral surface of the jacket 10 as shown in FIG. 1 when disposed about the column 2.

Therefore, the reverse portion RF of the ferromagnetic member 8 can be detected easily and reliably by use of a metal sensor or the like from the outside of the jacket 10. Also, by detecting the reverse portion RF of the ferromagnetic member 8, the position of the reverse portion R of each optical fiber unit 4, 4F can be found from outside the jacket 10. Namely, in the optical fiber cable 1, the position of the reverse portion R (RF) can easily be found, regardless of whether or not there is an indication of the position of the reverse portion R of each optical fiber unit 4, 4F. As a result, working efficiency would improve at the time when the optical fiber unit 4, 4F is exposed by removing a part of the jacket at the intermediate portion of the optical fiber cable 1 and so forth, and then the fiber stack 6 is taken out from the inside so as to cause an optical fiber within the stack 6 to branch off. Thus, the optical fiber cable 1 makes it easier to find out a location optimal for branching, and enables a flexible branching operation, thereby being suitably laid at a place (e.g., underground) where the margin in length of the optical fiber cable has to be made short.

Figure 4A:
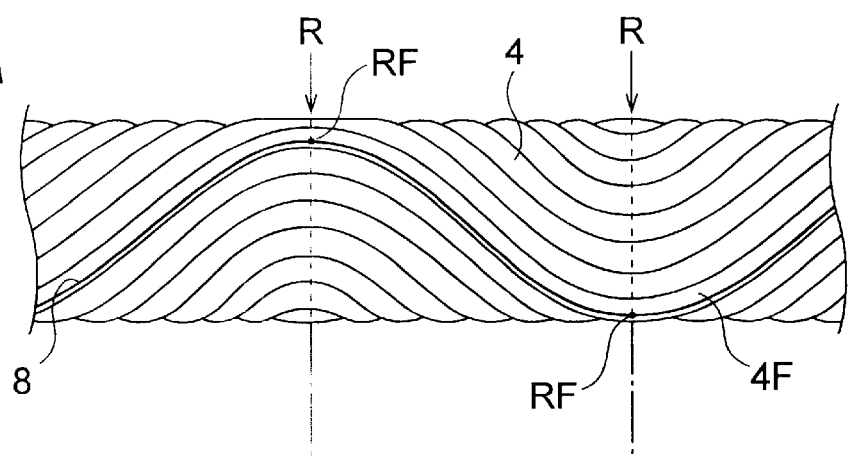
FIGS. 4A and 4B are plan views for explaining reverse-portion-indicating marks provided in the optical fiber cable of FIG. 1.
Figure 4B:
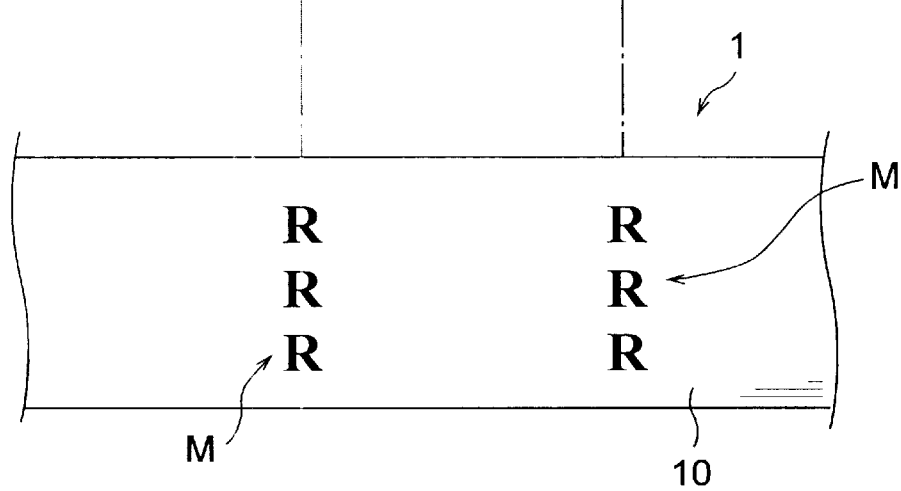

Further, as shown in FIGS. 4A and 4B, a reverse-portion-indicating mark M indicative of the position corresponding to each reverse portion R of the S-Z stranded line formed by the ferromagnetic member 8 is marked on the jacket 10 of the optical fiber cable 1. In the optical fiber cable 1, alphabet letters of "R" are marked as the reverse-portion-indicating mark M on the jacket 10 by use of a printer or the like. When the reverse-portion-indicating mark M is thus provided, at the time of taking out and branching an optical fiber from the fiber stack 6 by removing a part of the jacket 10 at the intermediate portion of the optical fiber cable 10 and so forth, the position of the reverse portion R most appropriate for the operation can more easily be found, and the working efficiency would improve extremely. Preferably, in view of the discernibility upon operation, the reverse-portion-indicating mark M is marked over the whole circumference of a circle about the center axis of the optical fiber cable 1 concentric therewith.

Figure 5A:
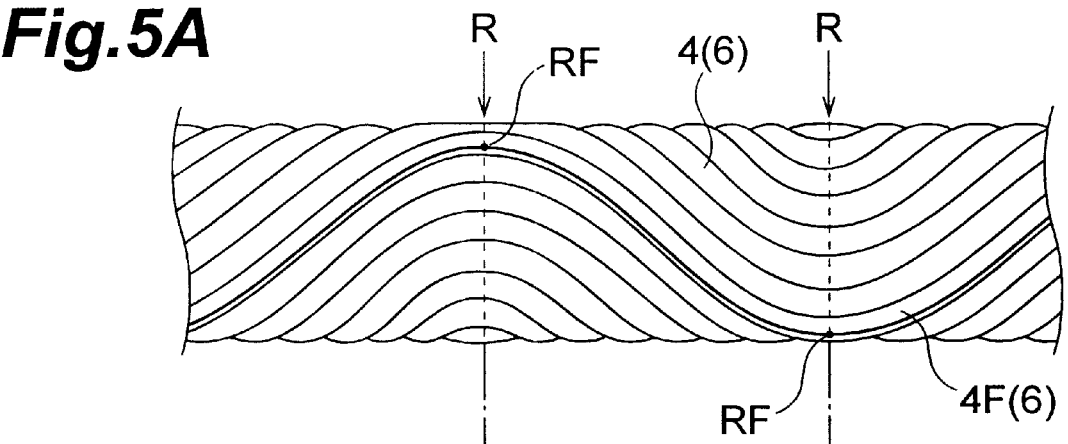
FIGS. 5A and 5B are plan views for explaining another embodiment of reverse-portion-indicating marks.
Figure 5B:
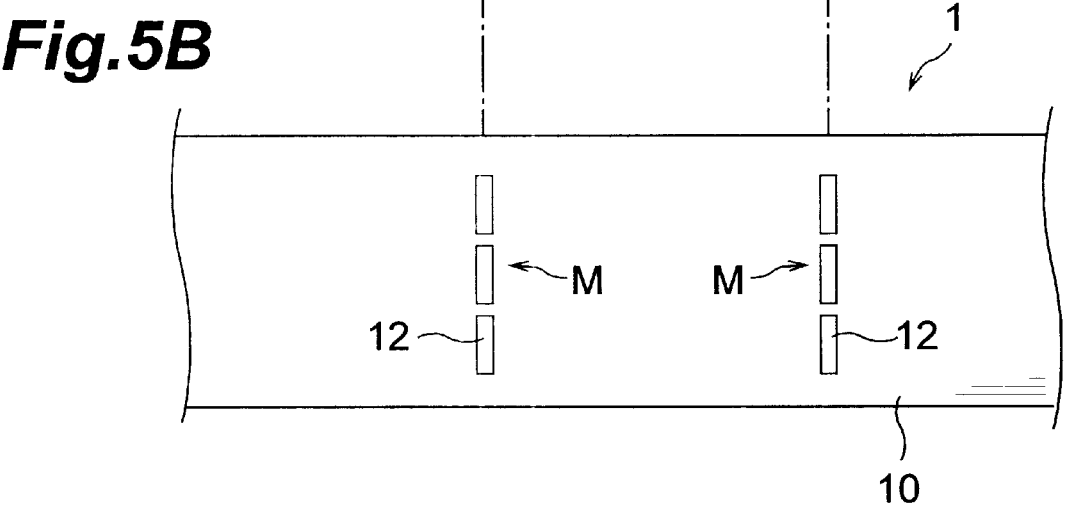

Also, as shown in FIGS. 5A and 5B, symbols or indicia may be used as the reverse-portion-indicating mark M. In the example shown in FIG. 5B, a metal strip 12 (e.g., a copper tape having a length of about 30 mm and a width of about 5 mm) is attached as the reverse-portion-indicating mark M to the jacket 10 at the position corresponding to the reverse portion R so as to be orthogonal to the longitudinal direction of the optical fiber cable 1. Such a configuration also makes it possible to discern the position of the reverse portion R quite easily from the outside of the jacket 10 of the optical fiber cable 1. Hence, when removing the jacket 10 for carrying out the branching after the optical fiber cable 1 is laid, the position of the reverse portion R most appropriate in terms of the operation can easily be found, whereby the working efficiency would improve extremely. Here, the form or the like of the reverse-portion-indicating mark M is not limited at all, and any of letters, symbols, and indicia can be used.

A method of making this optical fiber cable, i.e., a first embodiment of the method of making an optical fiber cable in accordance with the present invention, will now be explained.

Figure 6:
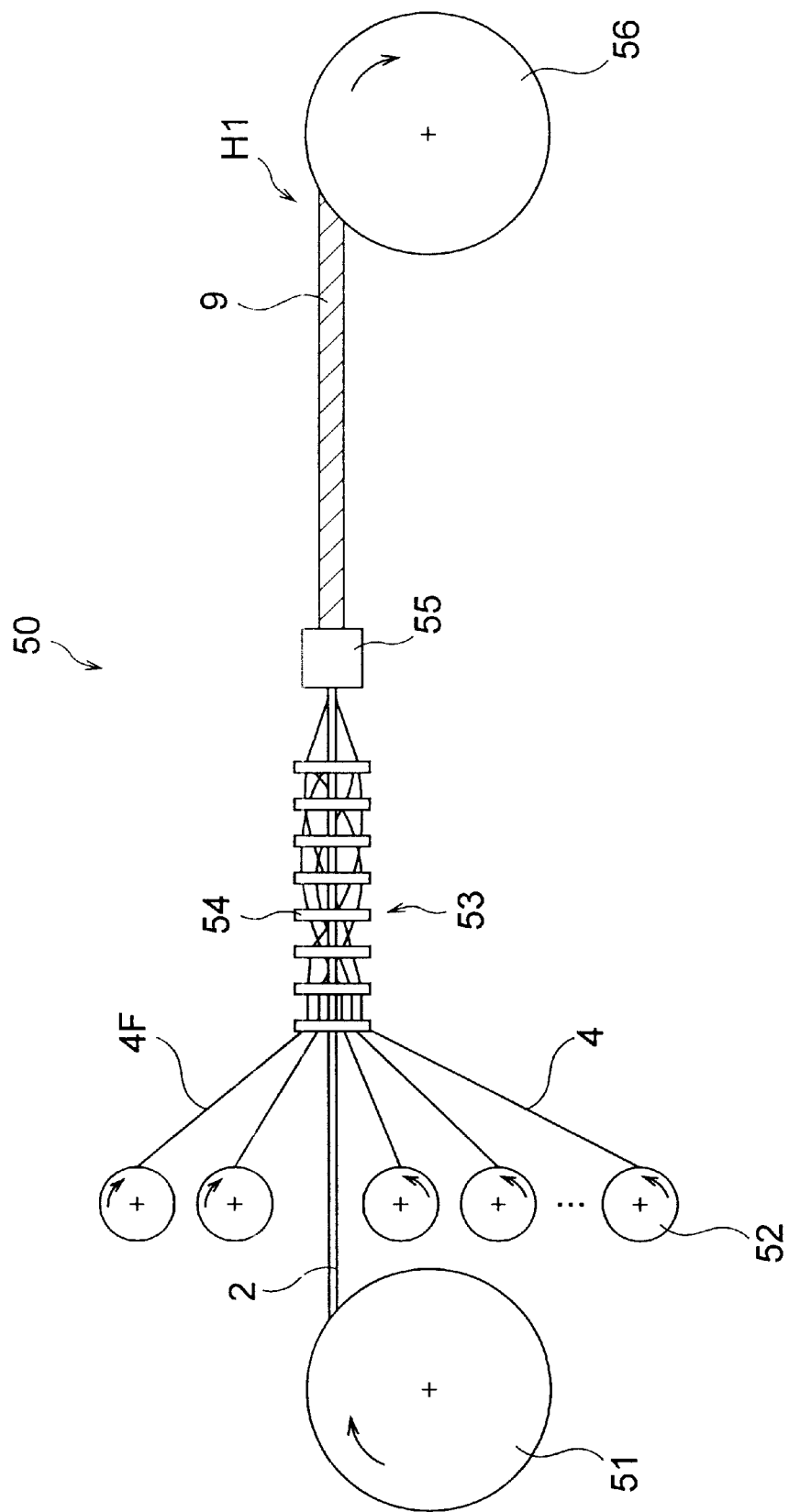
FIGS. 6 and 7 are schematic views showing an optical fiber cable manufacture line for making the optical fiber cable of FIG. 1.

First, for making the optical fiber cable 1, an optical fiber stranding line 50 shown in FIG. 6 is used for stranding optical fiber units 4, 4F about the column 2. In this case, the column 2 as the central member is wound about a core winding reel 51 beforehand. Also, the optical fiber units 4, 4F are wound about their respective optical fiber unit winding reels 52 beforehand. Then, from the core winding reel 51 and the optical fiber unit winding reels 52, one column 2 and a plurality of (15 in this case) optical fiber units 4, 4F are supplied to a lay plate group 53.

The optical fiber units 4, 4F are gradually S-Z stranded by individual lay plates 54 which pivot independently of each other while alternately changing their rotating directions within a predetermined reversal angle. About the optical fiber units 4, 4F stranded about the column 2, a thread or the like for temporarily securing the optical fiber units 4, 4F is wound and the winding binder tape 9 is tightly wound by a binder apparatus 55. As a consequence, the respective fiber stacks 6 contained in the individual optical fiber units 4, 4F are assembled about the column 2 as being S-Z stranded. Also, the ferromagnetic member 8 contained in the optical fiber unit 4F is arranged as being S-Z stranded along the fiber stack 6 contained in the optical fiber unit 4F. The half-finished product H1 in the state where the wrapping binder tape 9 is wound thereabout is taken up by a take-up reel 56.

Figure 7:
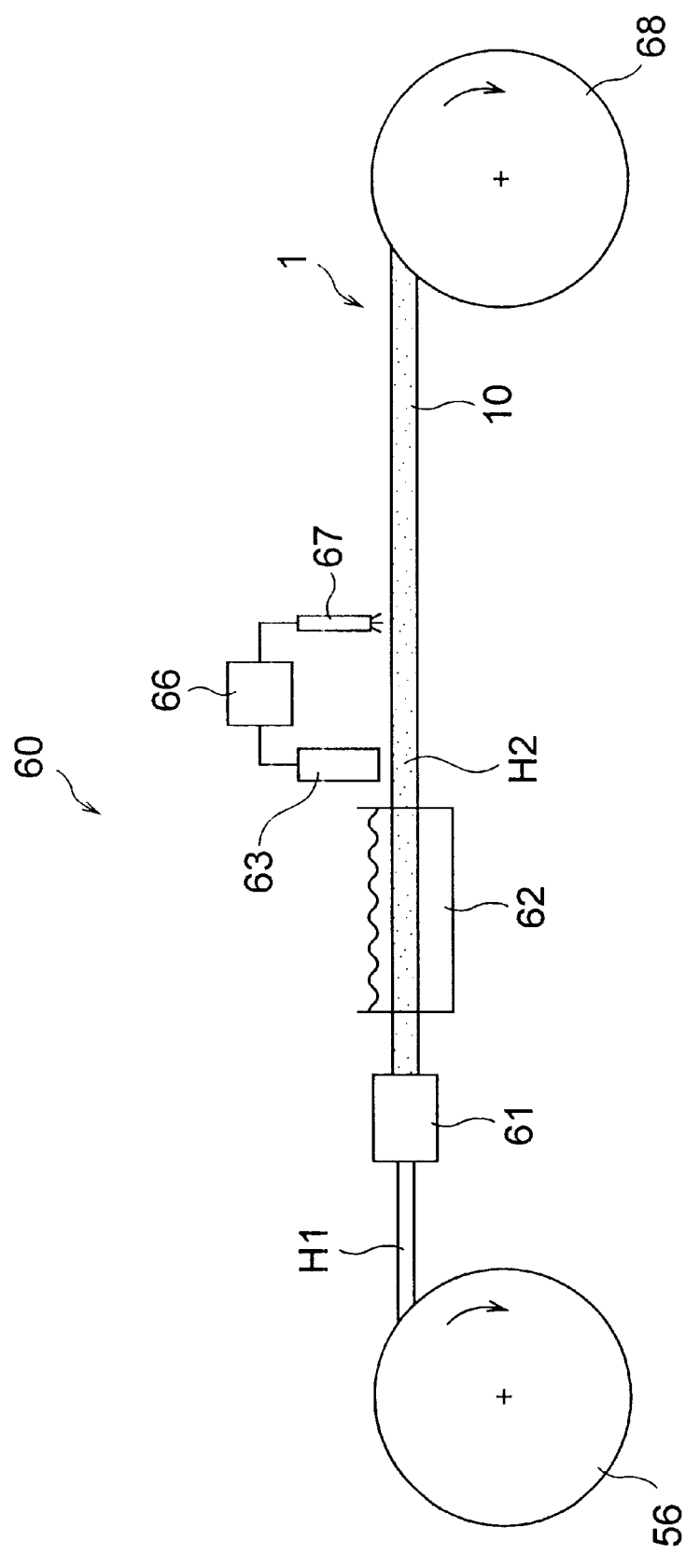

If the stranding of the optical fiber units 4, 4F to the column 2 is completed, then a jacket forming line 60 shown in FIG. 7 is used for providing the half-finished product H1 with the jacket 10. In this case, as shown in FIG. 7, the half-finished product H1 is supplied to a jacket extruder 61 from the take-up reel 56. From the jacket extruder 61, a half-finished product having the jacket 10 unified about the half-finished product H1 is extruded. The resulting half-finished product is introduced into a jacket-cooling water bath 62, whereby the jacket 10 is cooled to be solidified.

When the jacket 10 is solidified, then the ferromagnetic member 8 embedded in the upper end part of the side portion 5b of the chamber element 5F contained in the optical fiber unit 4F would be positioned near the inner peripheral surface of the jacket 10 by way of the wrapping binder tape 9 (see FIG. 1). The half-finished product H2 in the state where the jacket 10 is solidified passes a metal-detecting apparatus 63 disposed on the downstream side of the jacket-cooling water bath 62. The metal-detecting apparatus 63 is adapted to detect the position of the reverse portion RF of the ferromagnetic member 8 through the jacket 10.

Referring to FIGS. 8A to 8F and 9, a method of detecting the reverse portion RF of the ferromagnetic member 8 with the metal-detecting apparatus 63 will be explained. The metal-detecting apparatus 63 comprises a plurality of (e.g., 12) metal sensors 65 (e.g., EX-422 manufactured by Keyence Corp.) each having a coil 64, and detects the reverse portion RF according to the induced current generated in each coil 64. As shown in FIGS. 8A to 8F, the individual metal sensors 65 are disposed on a circle covering the circumference of the jacket 10 concentric therewith, while one side of each coil 64 faces the surface of the jacket 10. In FIGS. 8A to 8F, only three metal sensors 65a, 65b, 65c in the 12 metal sensors 65 are shown. As shown in FIG. 7, the metal-detecting apparatus 63 is connected to a control computer 66, so that a predetermined detection signal is sent from the metal-detecting apparatus 63 to the control computer 66 when an induced current is generated in the coil 64 of the respective metal sensor 65.

Figure 8:
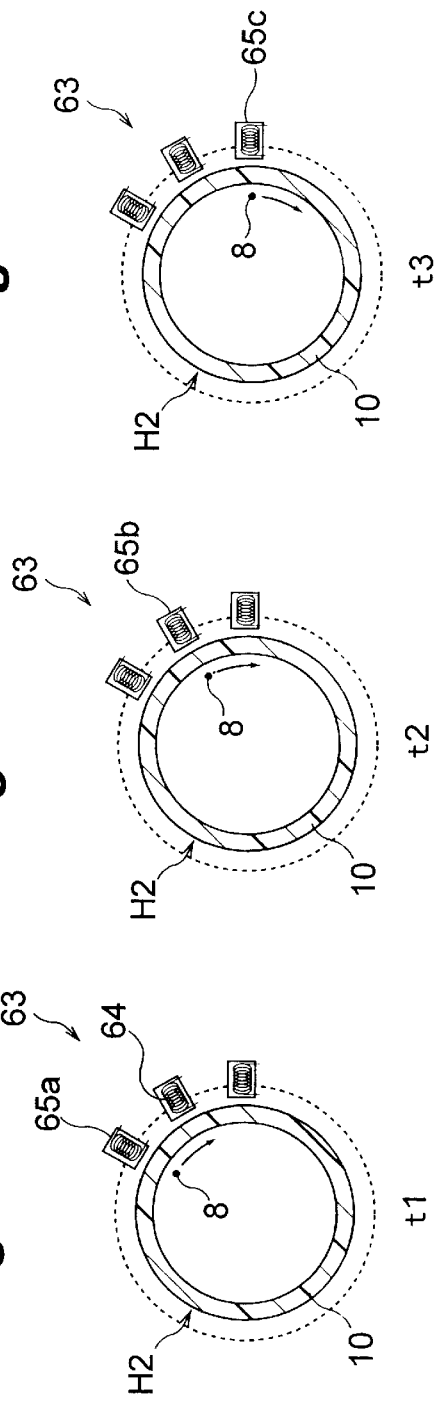
FIGS. 8A to 8F are schematic views for explaining a method of detecting a reverse portion of a ferromagnetic member.
Figure 9:
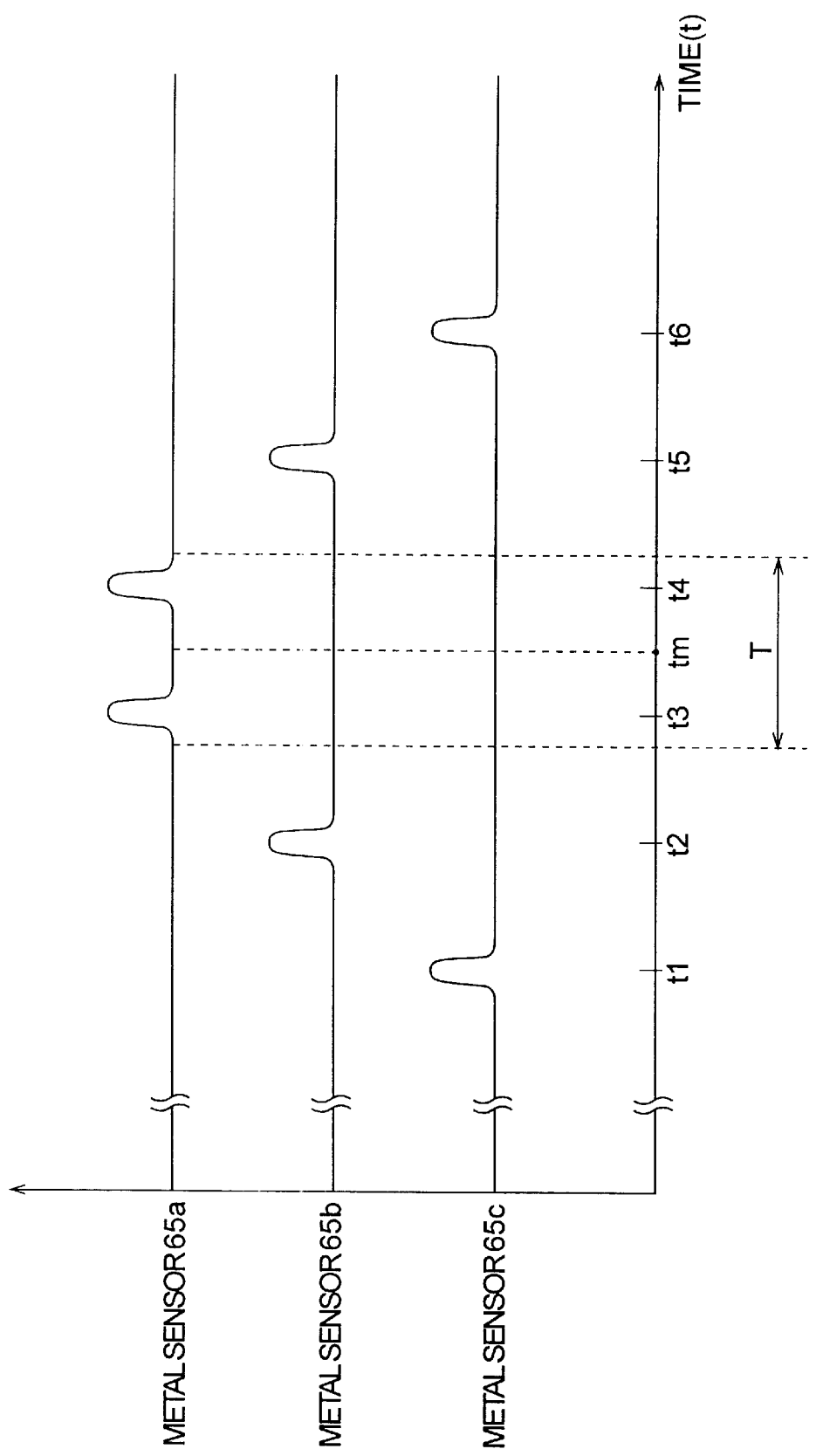
FIG. 9 is a chart for explaining the method of detecting the reverse portion of the ferromagnetic member.

Suppose that the ferromagnetic member 8 passes near the metal sensor 65a at a certain time t1 as shown in FIG. 8A. In this case, as shown in FIG. 9, an induced current is generated in the coil 64 of the metal sensor 65a, whereas a detection signal is sent from the metal sensor 65a to the control computer 66. Since the ferromagnetic member 8 extends as being S-Z stranded along one fiber stack 6, it passes, as the half-finished product H2 advances, near the metal sensor 65b neighboring the metal sensor 65a (at time t2, see FIG. 8B), and further passes near the metal sensor 65c neighboring the metal sensor 65b (at time t3, see FIG. 8C).

Also, the ferromagnetic member 8 extending as being S-Z stranded has a reverse portion RF. Therefore, during the time after the ferromagnetic member 8 passes near the metal sensor 65c once until a predetermined time T (see FIG. 9) elapses, for example, the ferromagnetic member 8 passes near the metal sensor 65c again (at time t4, see FIG. 8D). Namely, in this example, as shown in FIGS. 8C and 8D, the reverse portion RF of the ferromagnetic member RF passes near the metal sensor 65c at an intermediate time tm between the times t3 and t4. As a consequence, the reverse portion RF of the ferromagnetic member 8 can be detected easily and reliably from the outside of the jacket 10 according to the detection signal emitted from each metal sensor 65 of the metal-detecting apparatus 63.

Connected to the computer 66 is a marker apparatus 67 disposed downstream from the metal-detecting apparatus 63 and adapted to mark the reverse-portion-indicating mark M on the jacket 10. When letters are used as the reverse-portion-indicating mark M as shown in FIG. 4B, a printer (e.g., an ink-jet printer manufactured by Imaje S.A.) is employed as the marker apparatus 67. Here, three printers are preferably disposed for providing the reverse-portion-indicating mark M over the whole periphery of the jacket 10. On the other hand, when a label using a metal strip is to be attached as the reverse-portion-indicating mark M as shown in FIG. 5B, a tape labeling machine is preferably used as the marker apparatus 67.

According to the detection signal received from the metal-detecting apparatus 63, the control computer 66 carries out a predetermined calculation, so as to determine a timing at which the reverse portion RF of the ferromagnetic member 8 reaches the position below the marker apparatus 67. Namely, in the case where an induced current is generated twice (times t3 and t4 in FIGS. 8C and 8D) in the coil 64 contained in one of the metal sensors 65 within a predetermined time T, the control computer 66 determines, according to the detection signal sent from the metal-detecting apparatus 63 (metal sensor 65), the midpoint time tm between the times (t3, t4) at which the induced current is generated in the one metal sensor 65, and assumes that the reverse portion RF of the ferromagnetic member 8 has passed the metal-detecting apparatus 63 at this time tm.

When the reverse portion RF of the ferromagnetic member 8 reaches the position below the marker apparatus 67, then the control computer 66 actuates the marker apparatus 67. The core apparatus 67 applies the reverse-portionindicating mark M (e.g., letters of "R") onto the jacket 10 covering near the reverse portion RF (R). Thus, the optical fiber cable 1 shown in FIG. 1 having the jacket 10 shown in FIG. 4B or 5B is completed. Thus completed optical fiber cable 1 is taken up by a take-up reel 68.

Thus, in accordance with the method of making an optical fiber cable in accordance with the present invention, the optical fiber cable 1 in which the reverse portion R of the S-Z stranded line formed by each optical fiber unit 4, 4F is discernible from the outside of the jacket 10 can be made easily at a low cost. Also, the reverse-portion-indicating mark M can be attached to the jacket 10 while in the state accurately corresponding to the position of the reverse portion R of S-Z stranded lines formed by the optical fiber unit 4, 4F. Further, it becomes possible to confirm, after the optical fiber cable 1 is accomplished, whether the reverse-portion-indicating mark M accurately corresponds to the position of the reverse portion R of the fiber stack 6 or not. In addition, since it becomes unnecessary to effect marking for indicating the reverse portion R before the jacket 10 is marked, marking materials (paints, various tapes, and the like) can be prevented from mingling with the jacket materials when disposing the jacket 10.

Though the jacket 10 is extrusion-molded and cooled, and then the reverse portion RF of the ferromagnetic member 8 is detected through the jacket 10 by the metal-detecting apparatus 63, so as to provide the reverse-portion-indicating mark M here, the present invention should not be restricted thereto. Namely, the optical fiber cable 1 provided with the jacket 10 may be taken up once, and then the reverse-portion-indicating mark M may be attached onto the jacket 10 in another line.

Second Embodiment

Figure 10:
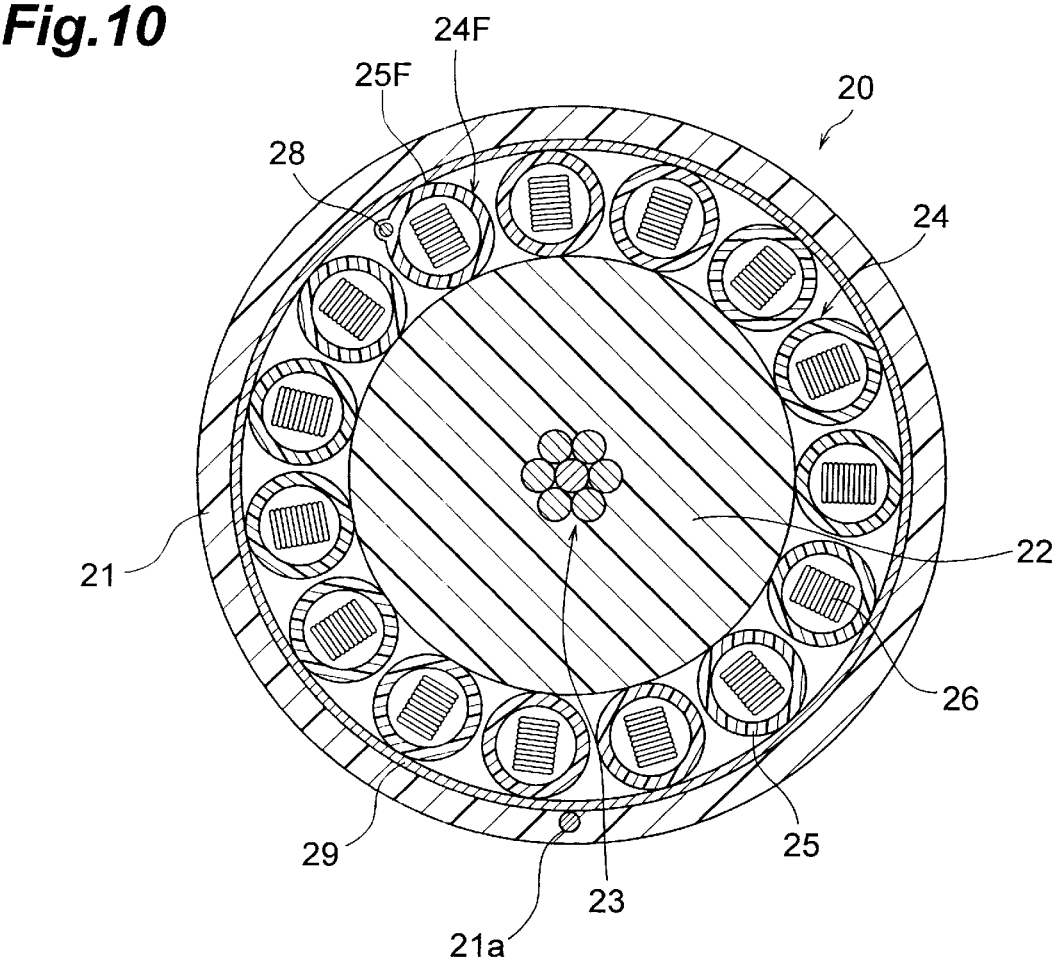
FIG. 10 is a sectional view showing a second embodiment of the optical fiber cable in accordance with the present invention.
Figure 11:
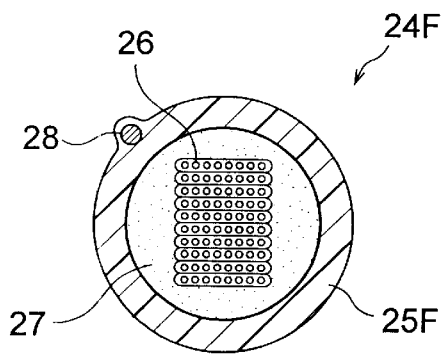
FIG. 11 is a sectional view showing an optical fiber unit contained in the optical fiber cable of FIG. 10.

FIG. 10 is a sectional view showing a second embodiment of the optical fiber cable in accordance with the present invention. The optical fiber cable 20 shown in this drawing has 15 optical fiber units 24 using loose tubes 25. As shown in FIG. 10, a ferromagnetic member 28 is secured to one of the 15 optical fiber units 24, i.e., optical fiber units 24F. As shown in FIG. 11, the optical fiber units 24F is constituted by a loose tube 25F (having an outside diameter of 6.0 mm and an inside diameter of 4.5 mm) made of polyethylene, and a fiber stack 26 including a large number of optical fibers contained within the tube 25F.

The ferromagnetic member 28 is embedded in the tube 25F. In this case, a 0.4-mm iron wire (ferromagnetic wire material) is used as the ferromagnetic member 28. For embedding the ferromagnetic member 28 in the tube 25F, it will be sufficient if the ferromagnetic member 28 is extrusion-molded together with molten polyethylene resin or the like. The fiber stack 26 is constituted by stacked 10 layers of 8-core optical fiber ribbons. The inside of the tube 25 is filled with grease 27, functioning as a cushioning material, together with the fiber stack 26. In each of the optical fiber units 24 other than the optical fiber units 24F, the tube 25 and the fiber stack 26 are unitized. The tube 25 is identical to the tube 25F except that the ferromagnetic member 28 is not embedded therein.

At the center portion of the optical fiber cable 20 there is an extra-long column 22 (made of LDPE resin, having a diameter of 25 mm) functioning as a central member. In the center of the column 22, a single strand of steel 23 is embedded. Seven steel wires each having a diameter of 2 mm are stranded so as to form the single strand of steel 23 as well. On the outer periphery of the column 22, 15 optical fiber units 24 are each S-Z stranded. Each optical fiber unit 24 has an S-Z strand pitch of 900 mm, and an S-Z reversal angle φ of 275°. A wrapping binder tape 29 is tightly wound about the optical fiber units 24. Further, a jacket 21, made of a low-density polyethylene, having an outside diameter of 41 mm, is disposed around the wrapping binder tape 29. Also, one tear string 21a is incorporated in the jacket 21.

For making this optical fiber cable 20, it will be sufficient if the optical fiber stranding line 50 shown in FIG. 6 is used for stranding the optical fiber units 24, 24F about the column 22. Namely, with the optical fiber units 24, 24F wound around the optical fiber unit winding reels 52, one column 22 and a plurality of (15 in this case) optical fiber units 24, 24F will be supplied to the lay plate group 53.

Third Embodiment

Figure 12:
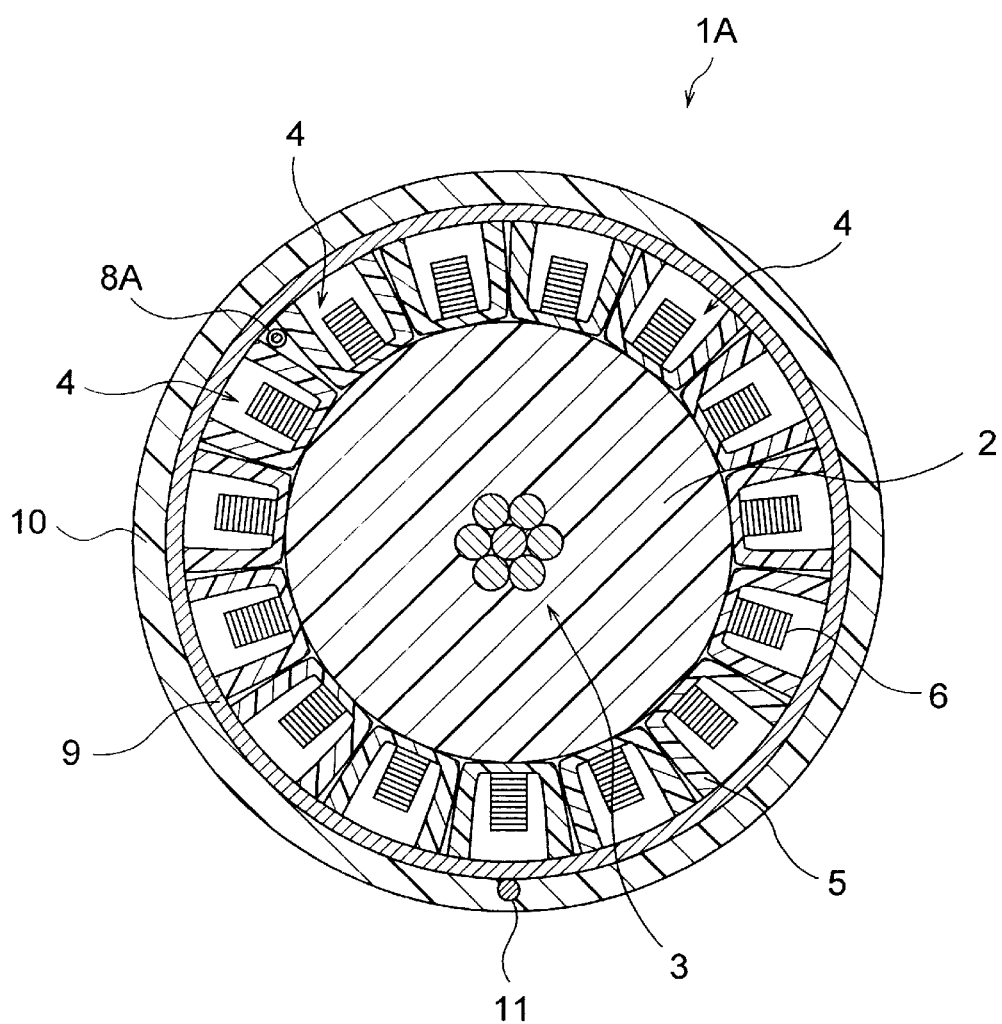
FIGS. 12 to 15 are sectional views showing third to sixth embodiments of the optical fiber cable in accordance with the present invention, respectively.

FIG. 12 is a sectional view showing a third embodiment of the optical fiber cable in accordance with the present invention. The optical fiber cable 1A shown in this drawing has a configuration basically the same as that of the optical fiber cable 1 shown in FIG. 1. The optical fiber cable 1A shown in FIG. 12 differs from the optical fiber cable 1 of FIG. 1 in that it has 15 identical optical fiber units 4 without the optical fiber unit 4F having the ferromagnetic member 8 secured thereto. In the optical fiber cable 1A, the individual optical fiber units 4 are assembled as being S-Z stranded about the column 2. Also, a ferromagnetic member 8A is disposed between one pair of neighboring optical fiber units 4. The ferromagnetic member 8A is a ferromagnetic wire material (having an outside diameter of 0.8 mm) composed of a steel wire having an outside diameter of 0.5 mm, and a polyethylene coating formed thereon. Thus, the ferromagnetic member may be disposed between two optical fiber units 4 instead of being secured within the single-slotted chamber element 5 of the optical fiber unit 4.

For making this optical fiber cable 1A, the optical fiber stranding line 50 shown in FIG. 6 is used for stranding the optical fiber units 4 about the column 2. Then, the ferromagnetic member 8A is supplied so as to extend along one of the optical fiber units 4. Preferably, in this case, a dedicated reel wound with the ferromagnetic member 8A is installed on the side of one optical fiber unit winding reel 52, and the ferromagnetic member 8A is supplied to the lay plate group 53 together with one optical fiber unit 4. Alternatively, the ferromagnetic member 8A may be temporarily attached to the single-slotted chamber element 5 contained in one of the optical fiber units 4 with a tape or the like, and such an optical fiber unit 4 may be wound around the optical fiber winding reel 52 and supplied to the lay plate group 53.

Fourth Embodiment

Figure 13:
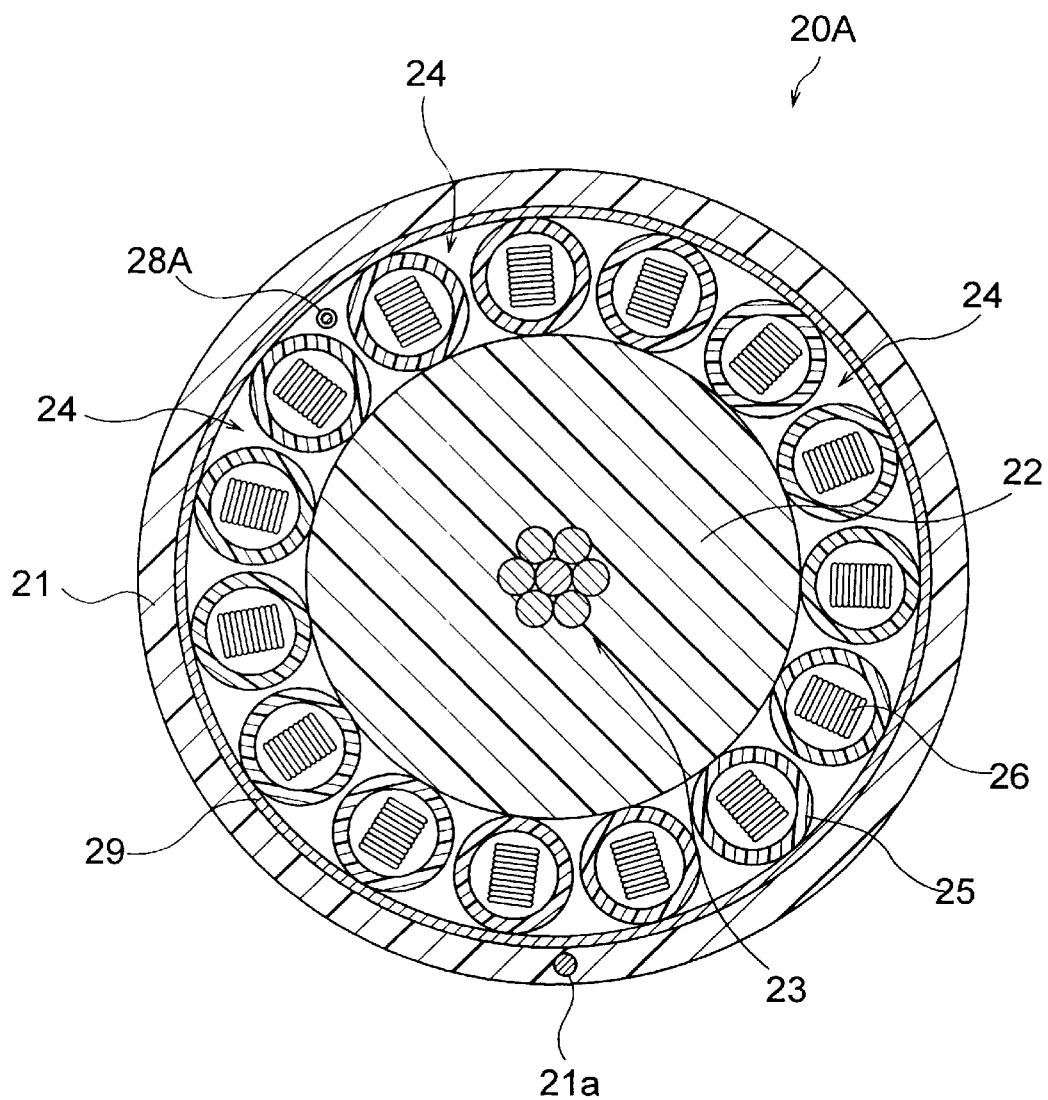

FIG. 13 is a sectional view showing a fourth embodiment of the optical fiber cable in accordance with the present invention. The optical fiber cable 20A shown in this drawing has a configuration basically the same as that of the optical fiber cable 20 shown in FIG. 10. The optical fiber cable 20A shown in FIG. 13 differs from the optical fiber cable 1 of FIG. 1 in that it has 15 identical tubes 25 without the tube 25F having the ferromagnetic member 28 secured thereto for optical fiber units 24. In the optical fiber cable 20A, the individual tubes 25 (optical fiber units 24) are assembled as being S-Z stranded about the column 22. Also, a ferromagnetic member 28A is disposed between one pair of neighboring tubes 25. The ferromagnetic member 28A is a ferromagnetic wire material (having an outside diameter of 0.8 mm) composed of a steel wire having an outside diameter of 0.5 mm, and a polyethylene coating formed thereon. Thus, the ferromagnetic member may be disposed between two tubes 25 instead of being secured within the tube 25 of the optical fiber units 24.

For making this optical fiber cable 20A, the optical fiber stranding line 50 shown in FIG. 6 is used for stranding the optical fiber units 24 about the column 22. Then, the ferromagnetic member 28A is supplied so as to extend along one of the optical fiber units 24. Preferably, in this case, a dedicated reel wound with the ferromagnetic member 28A is installed on the side of one optical fiber unit winding reel 52, and the ferromagnetic member 28A is supplied to the lay plate group 53 together with one optical fiber unit 24. Alternatively, the ferromagnetic member 28A may be temporarily attached to the tube 25 contained in one of the optical fiber units 24 with a tape or the like, and such an optical fiber unit 24 may be wound around the optical fiber winding reel 52 and supplied to the lay plate group 53.

Fifth Embodiment

Figure 14:
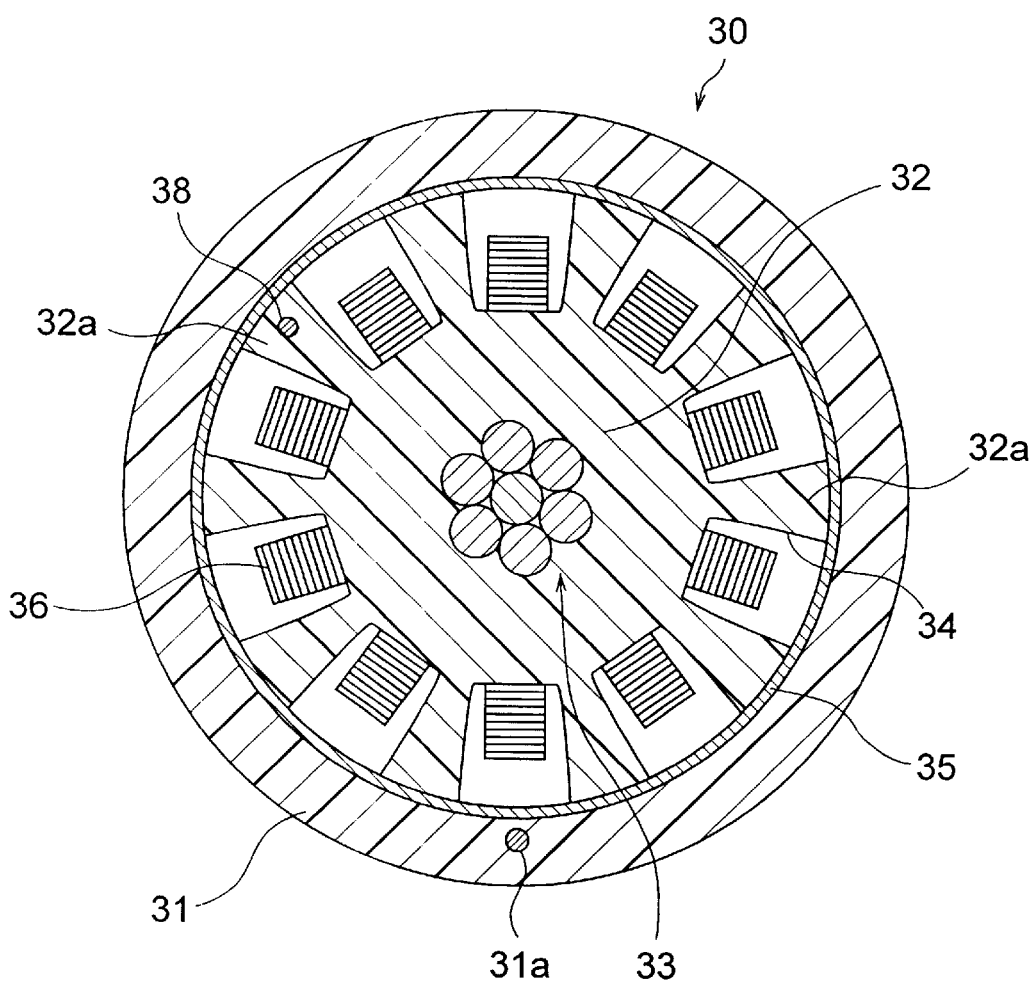

FIG. 14 is a sectional view showing a fifth embodiment. The optical fiber cable 30 shown in this drawing employs a multi-slotted chamber element 32 (having an outside diameter of 24 mm) made of an HDPE resin as a central member. A strand of steel wire 33 is embedded in the center of the multi-slotted chamber element 32. Seven steel wires each having a diameter of 2 mm are stranded so as to form the single strand of steel 33 as well. On the outer periphery of the multi-slotted chamber element 32, 10 S-Z stranded slots 34 are formed. Each slot 34 has a depth of 4.3 mm, an upper width (corresponding to bu in FIG. 2) of 4.2 mm, and a bottom width of 3.2 mm. Further, each slot has an S-Z strand pitch of 700 mm, and an S-Z reversal angle $\phi$ of 275°.

Also, in the multi-slotted chamber element 32, a ferromagnetic member 38 is secured so as to be positioned between one pair of neighboring slots 34. In the multi-slotted chamber element 32 having a plurality of S-Z stranded slots 34 formed on the outer periphery thereof, a rib 32a located between one pair of neighboring slots 34 extends in an S-Z form. In the multi-slotted chamber element 32, one ferromagnetic member 38 is embedded in such an S-Z extending rib 32a. In this optical fiber cable 32, a 0.4-mm iron wire (ferromagnetic wire material) is used as the ferromagnetic member 38. As the ferromagnetic member 38, not only the iron wire, but also a nickel wire, a cobalt wire, and the like may be used.

Each slot 34 contains a fiber stack 36 (optical fiber) in which 10 layers of 8-core optical fiber ribbons are stacked. As a consequence, the fiber stacks 36 are assembled as being S-Z stranded within the respective slots 34 of the multi-slotted chamber element 32 functioning as the central member. Also, the ferromagnetic member 38 extends along the S-Z stranded line formed by one fiber stack 36. A wrapping binder tape 35 made of a nonwoven fabric or the like is tightly wound about the multi-slotted chamber element 32 in which the fiber stacks 36 are contained in the respective slots 34. Further, a jacket 31 (having an outside diameter of 29 mm), made of a low-density polyethylene, incorporating a tear string 31a therein is disposed around the wrapping binder tape 35. Since the ferromagnetic member 38 is secured as being embedded in a rib 32a of the multi-slotted chamber element 32, it is located near the inner peripheral surface of the jacket 31.

For making the optical fiber cable 30, the multi-slotted chamber element 32 made by extrusion-molding the ferromagnetic member 38 together with molten HDPE resin or the like is used. The fiber stack 36 having optical fibers is accommodated in each slot 34 of the multi-slotted chamber element 32. Then, the jacket-forming line 60 shown in FIG. 7 may be used for disposing the jacket 31 about the multi-slotted chamber element 32 containing the fiber stacks 36.

Sixth Embodiment

Figure 15:
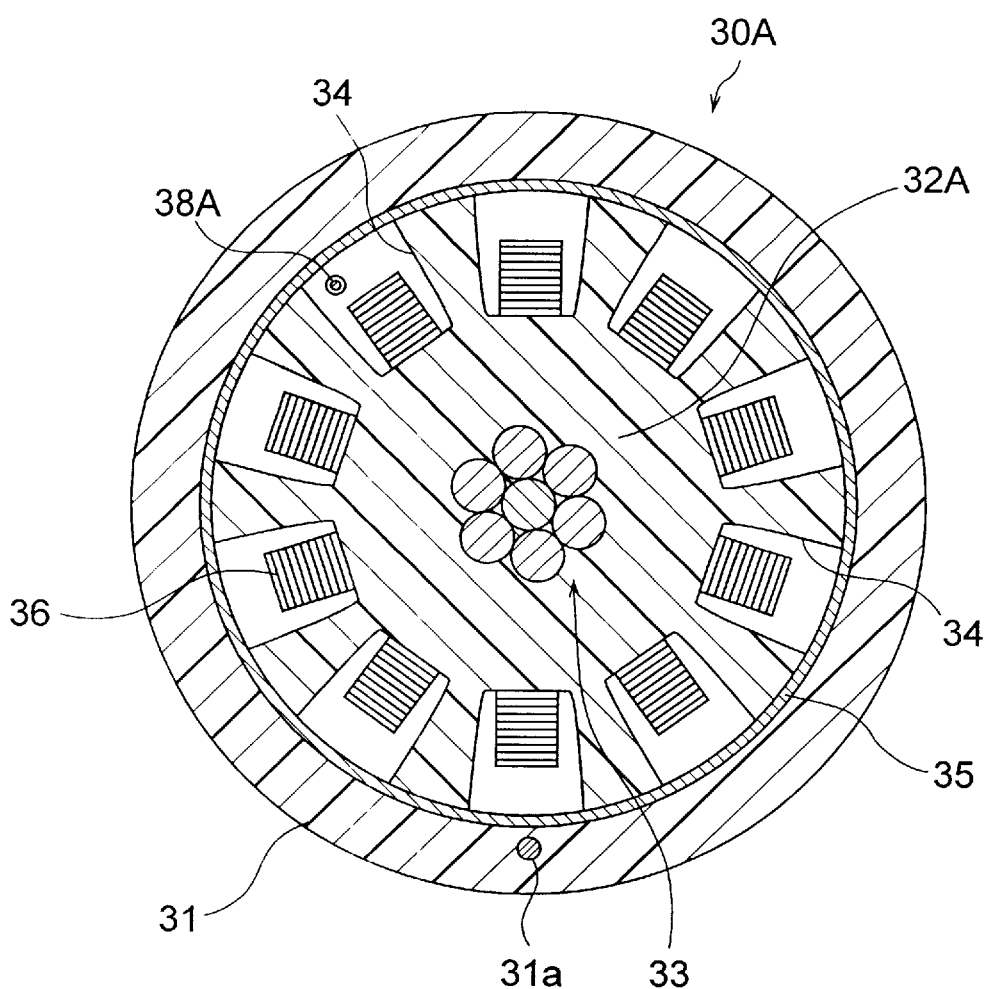

FIG. 15 is a sectional view showing a sixth embodiment of the optical fiber cable in accordance with the present invention. The optical fiber cable 30A shown in this drawing has basically the same configuration as that of the optical fiber cable 30 shown in FIG. 14. The optical fiber cable 30A shown in FIG. 15 differs from the optical fiber cable 30 of FIG. 14 in that it includes a multi-slotted chamber element 32A to which the ferromagnetic member 38 is not secured. In this optical fiber cable 30A, a ferromagnetic member 38A is contained in one of slots 34. The ferromagnetic member 38A is a ferromagnetic wire material (having an outside diameter of 0.8 mm) constituted by a steel wire having an outside diameter of 0.5 mm, and a polyethylene coating formed thereon. Also in such a configuration, the ferromagnetic member 38A is disposed near the inner peripheral surface of the jacket 31, and extends along the S-Z stranded line formed by one fiber stack 36 (including optical fibers).

For making this optical fiber cable 30A, a typical multi-slotted chamber element 32A containing a steel strand 33 therein is used. When the fiber stacks 36 are being contained in the respective slots 34 of the multi-slotted chamber element 32, the ferromagnetic member 38A is contained in one of the slots 34 together with the fiber stack 36.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber cable with a jacket in which a plurality of optical fibers are assembled as being S-Z stranded about a central member, said optical fiber cable further comprising;
    a ferromagnetic member disposed near an inner peripheral surface of said jacket along an S-Z stranded line formed by one of said optical fibers.

2. An optical fiber cable according to claim 1, wherein said ferromagnetic member is an iron wire.

3. An optical fiber cable according to claim 1, wherein a reverse-portion-indicating mark indicative of a position corresponding a reverse portion of an S-Z stranded line formed by said ferromagnetic member is marked on said jacket.

4. An optical fiber cable according to claim 1, wherein said central member is a multi-slotted chamber element having a plurality of S-Z stranded slots, each containing a predetermined number of said optical fibers therein, formed on an outer periphery thereof, said ferromagnetic member being secured so as to be positioned between a pair of said slots neighboring each other or within one of said slots.

5. An optical fiber cable according to claim 1, further comprising a plurality of optical fiber units each containing a predetermined number of said optical fibers therein, said optical fiber units being assembled as being stranded about said central member, said ferromagnetic member being disposed between a pair of said optical fiber units neighboring each other or within one of said optical fiber units.

6. An optical fiber cable according to claim 5, wherein said optical fiber unit comprises a predetermined number of said optical fibers and a single-slotted chamber element containing said optical fibers within the slot thereof.

7. An optical fiber cable according to claim 5, wherein said optical fiber unit comprises a predetermined number of said optical fibers and a loose tube containing said optical fibers therewithin.

8. A method of making an optical fiber cable with a jacket in which a plurality of optical fibers are assembled as being S-Z stranded about a central member, said method comprising the step of disposing a ferromagnetic member along an S-Z strand formed by one of said optical fibers so as to position said ferromagnetic member near an inner peripheral surface of said jacket.

9. A method of making an optical fiber cable according to claim 8, wherein said ferromagnetic member is an iron wire.

10. A method of making an optical fiber cable according to claim 8, further comprising the step of detecting a reverse portion of an S-Z stranded line formed by said ferromagnetic member from outside said jacket and marking a reverse-portion-indicating mark at a position of said jacket corresponding to said reverse portion.

11. A method of making an optical fiber cable according to claim 10, wherein, for detecting the reverse portion of said ferromagnetic member, a plurality of metal sensors each having a coil are used, and said reverse portion is detected according to an induced current generated in said coil.

12. A method of making an optical fiber cable according to claim 8, wherein a multi-slotted chamber element having a plurality of S-Z stranded slots formed on an outer periphery thereof is used as said central member, said ferromagnetic member being secured between a pair of said slots neighboring each other or within one of said slots.

13. A method of making an optical fiber cable according to claim 8, further comprising the step of using a plurality of optical fiber units containing said optical fibers therein, and assembling said optical fiber units as being S-Z stranded about said central member.

14. A method of making an optical fiber cable according to claim 13, wherein, for assembling said optical fiber units about said central member, said ferromagnetic member is supplied along one of said optical fiber units.

15. A method of making an optical fiber cable according to claim 13, further comprising the step of securing said ferromagnetic member to one of said optical fiber units beforehand.

16. A method of making an optical fiber cable according to claim 13, further comprising the step of making each of said optical fiber units by containing a predetermined number of said optical fibers within a slot of a single-slotted chamber element.

17. A method of making an optical fiber cable according to claim 13, further comprising the step of making each of said optical fiber units by containing a predetermined number of said optical fibers within a loose tube.

* * * * *